US012644072B2

(12) United States Patent
Anderson et al.

(10) Patent No.: US 12,644,072 B2
(45) **Date of Patent: *Jun. 2, 2026**

(54) HARD SURFACE CLEANING COMPOSITIONS WITH REDUCED SURFACE TENSION

(71) Applicant: ECOLAB USA INC., Saint Paul, MN (US)

(72) Inventors: Derrick Anderson, Saint Paul, MN (US); Erik C. Olson, Saint Paul, MN (US); Melissa Martinez-Crowley, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,005

(22) Filed: Nov. 17, 2023

(65) Prior Publication Data

US 2024/0093122 A1 Mar. 21, 2024

Related U.S. Application Data

(63) Continuation of application No. 16/946,778, filed on Jul. 6, 2020, now Pat. No. 11,845,910.

(60) Provisional application No. 62/870,409, filed on Jul. 3, 2019.

(51) Int. Cl.

| | |
|---|---|
| ***C11D 1/00*** | (2006.01) |
| ***C11D 1/04*** | (2006.01) |
| ***C11D 1/14*** | (2006.01) |
| ***C11D 1/22*** | (2006.01) |
| ***C11D 1/52*** | (2006.01) |
| ***C11D 1/75*** | (2006.01) |
| ***C11D 1/83*** | (2006.01) |
| ***C11D 3/40*** | (2006.01) |
| ***C11D 17/00*** | (2006.01) |

(52) U.S. Cl.

CPC .................. *C11D 1/22* (2013.01); *C11D 1/04* (2013.01); *C11D 1/143* (2013.01); *C11D 1/52* (2013.01); *C11D 1/75* (2013.01); *C11D 1/83* (2013.01); *C11D 3/40* (2013.01); *C11D 17/0008* (2013.01); *C11D 2111/24* (2024.01)

(58) Field of Classification Search

CPC .................................... C11D 1/22; C11D 1/83

See application file for complete search history.

(56) References Cited

U.S. PATENT DOCUMENTS

| | | | | |
|---|---|---|---|---|
| 5,700,768 A | 12/1997 | Lu | | |
| 2012/0102668 A1* | 5/2012 | De Leersnyder | ........ | C11D 1/94 510/427 |
| 2017/0096623 A1 | 4/2017 | Tollens et al. | | |

(Continued)

FOREIGN PATENT DOCUMENTS

| | | |
|---|---|---|
| CN | 105733843 A | 7/2016 |

*Primary Examiner* — Necholus Ogden, Jr.

(74) *Attorney, Agent, or Firm* — McKee. Voorhees & Sease, PLC

(57) ABSTRACT

The disclosure relates to hard surface cleaning compositions, methods of making the hard surface cleaning compositions, and methods of using the hard surface cleaning compositions. In particular, the hard surface cleaning compositions have reduced surface tension for cleaning surfaces with low surface free energy. Preferably, the hard surface cleaning compositions have low contact angles on a variety of surfaces.

14 Claims, 6 Drawing Sheets

(56) References Cited

U.S. PATENT DOCUMENTS

| | | | |
|---|---|---|---|
| 2017/0369817 | A1 | 12/2017 | Deleersnyder |
| 2018/0087007 | A1 | 3/2018 | Vandenberghe et al. |

* cited by examiner

HARD SURFACE CLEANING COMPOSITIONS WITH REDUCED SURFACE TENSION

CROSS REFERENCE

This is a continuation application of U.S. Ser. No. 16/946,778, filed Jul. 6, 2020, which claims priority under 35 U.S.C. § 119 to U.S. Provisional Application Ser. No. 62/870,409 filed on Jul. 3, 2019, entitled "HARD SURFACE CLEANING COMPOSITIONS WITH REDUCED SURFACE TENSION", which is herein incorporated by reference in its entirety, including without limitation, the description, claims, figures, and examples.

FIELD OF THE INVENTION

The invention relates to hard surface cleaning compositions. In particular, hard surface cleaning compositions having reduced surface tension for cleaning surfaces with low surface free energy.

BACKGROUND OF THE INVENTION

The development of new surface materials and coatings, and in particular energy efficient materials and coatings, has resulted in greater difficulties for cleaning soils. Many surfaces are more hydrophobic and now have lower surface free energy making it more difficult to remove soils. An additional complication is that in certain contexts multiple types of surfaces and soils are encountered in a single location. For example, in restaurants the floors in the kitchen, dining area, and entry ways can differ greatly and the soils encountered in those areas can differ greatly whether the soils are tracked in by shoes, food soils, or cooking soils. Historically such distinctions in surface and soil types have necessitated different cleaning compositions for the different areas and different soils.

Accordingly, it is an objective of this disclosure to develop cleaning compositions that are useful on varying surface types and useful for removing multiple types of soils.

A further object of this disclosure is the development of cleaning compositions and methods that can remove soils from surfaces having a low surface free energy.

Other objects, advantages and features of this disclosure will become apparent from the following specification taken in conjunction with the accompanying figures.

BRIEF SUMMARY OF THE INVENTION

The hard surface cleaning compositions described herein are advantageous as they have reduced surface tension. It is an advantage of the technology described herein that the hard surface cleaning compositions described herein are particularly suitable for cleaning multiple surface types and removing multiple soil types. Still a further advantage of the cleaning compositions described herein is that they are able to wet surfaces having a low surface free energy.

A preferred embodiment is a hard surface cleaning composition comprising an anionic surfactant, wherein the anionic surfactant is sulfated, sulfonated, and/or carboxylated; an amphoteric surfactant, wherein the amphoteric surfactant comprises an amine oxide, a betaine, sultaine, or a mixture thereof; and water. In a preferred embodiment, the hard surface cleaning composition further comprises a nonionic surfactant, pH modifier, or combination thereof. In a preferred embodiment, the hard surface cleaning composition comprises an alkalinity source, a water conditioning agent, and has a pH between about 7 and about 14 when in a use solution. In a preferred embodiment, the hard surface cleaning composition comprises an acid source and has a pH between about 3 and about 7 when in a use solution. The hard surface cleaning compositions can be concentrated compositions or use solutions. The concentrated hard surface compositions can be solid or liquid.

The present disclosure also describes methods of preparing the hard surface cleaning compositions including methods of preparing liquid and solid compositions, concentrated compositions and use solutions.

The present disclosure also describes methods of cleaning a hard surface comprising contacting a hard surface with a hard surface cleaning composition. In a preferred embodiment, the hard surface can be rinsed after contact with the hard surface cleaning composition.

While multiple embodiments are disclosed, still other embodiments will become apparent to those skilled in the art from the following detailed description, examples, and accompanying figures, which shows and describes illustrative embodiments of the invention. Accordingly, the figures and detailed description are to be regarded as illustrative in nature and not restrictive.

Figure 1:
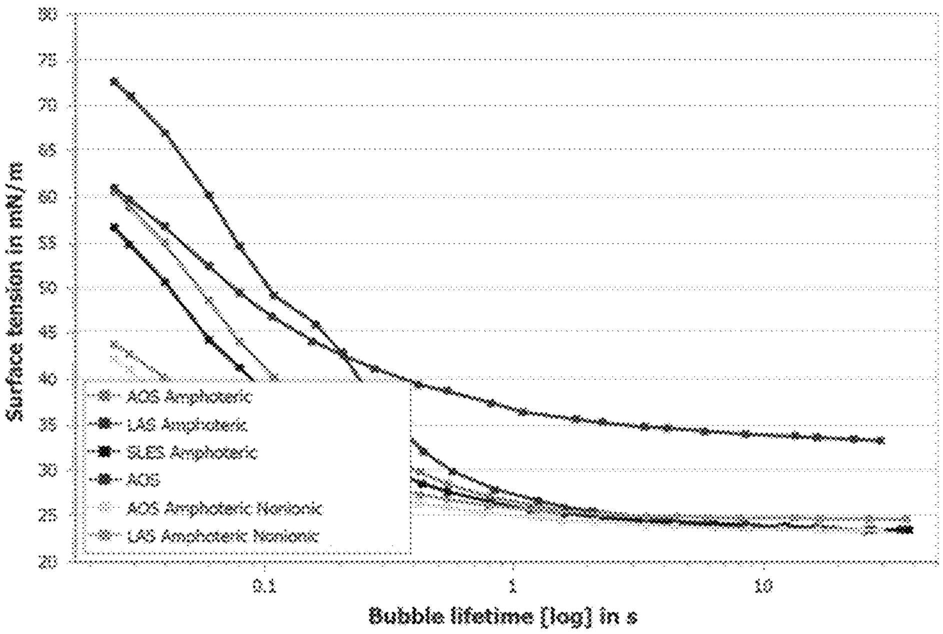
FIG. 1 shows a comparison of the dynamic surface tension of various surfactant blends including combinations of anionic, amphoteric, and nonionic surfactants.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present disclosure relates to hard surface cleaning compositions with reduced surface tension and methods of making and using the same. The hard surface cleaning compositions described herein have many advantages over existing hard surface cleaning compositions. For example, the hard surface cleaning compositions having reduced surface tension and are suitable for cleaning surfaces with low surface free energy. Further, the hard surface cleaning compositions are effective at cleaning a variety of surfaces and effective at removing a variety of soil types.

The embodiments of this invention are not limited to particular hard surfaces or soils, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

References to elements herein are intended to encompass any or all of their oxidative states and isotopes. For example discussion of aluminum can include $Al^{I}$, $Al^{II}$, or $Al^{III}$ and references to boron include any of its isotopes, i.e., $^{6}B$, $^{7}B$, $^{8}B$, $^{9}B$, $^{10}B$, $^{11}B$, $^{12}B$, $^{13}B$, $^{14}B$, $^{15}B$, $^{16}B$, $^{17}B$, $^{18}B$, and $^{19}B$.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

As used herein, the term "analog" means a molecular derivative of a molecule. The term is synonymous with the terms "structural analog" or "chemical analog."

As used herein, the term "oligomer" refers to a molecular complex comprised of between one and ten monomeric units. For example, dimers, trimers, and tetramers, are considered oligomers. Furthermore, unless otherwise specifically limited, the term "oligomer" shall include all possible isomeric configurations of the molecule, including, but are not limited to isotactic, syndiotactic and random symmetries, and combinations thereof. Furthermore, unless otherwise specifically limited, the term "oligomer" shall include all possible geometrical configurations of the molecule.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

The term "polyol ester" refers to an ester of an organic compound containing at least two hydroxyls with at least one carboxylic acid.

The term "weight percent," "wt. %," "wt-%," "percent by weight," "% by weight," and variations thereof, as used herein, refer to the concentration of a substance as the weight of that substance divided by the total weight of the composition and multiplied by 100.

As used herein, the term "cleaning" refers to a method used to facilitate or aid in soil removal.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

The term "generally recognized as safe" or "GRAS," as used herein refers to components classified by the Food and Drug Administration as safe for direct human food consumption or as an ingredient based upon current good manufacturing practice conditions of use, as defined for example in 21 C.F.R. Chapter 1, § 170.38 and/or 570.38.

The term "hard surface" refers to a solid, substantially non-flexible surface such as a counter top, tile, floor, wall, panel, window, plumbing fixture, kitchen and bathroom furniture, appliance, engine, circuit board, dish, partitions, railings, and tables. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present invention.

As used herein, the phrase "meat product" refers to all forms of animal flesh, including the carcass, muscle, fat, organs, skin, bones and body fluids and like components that form the animal. Animal flesh includes, but is not limited to, the flesh of mammals, birds, fishes, reptiles, amphibians, snails, clams, crustaceans, other edible species such as lobster, crab, etc., or other forms of seafood. The forms of animal flesh include, for example, the whole or part of animal flesh, alone or in combination with other ingredients. Typical forms include, for example, processed meats such as cured meats, sectioned and formed products, minced products, finely chopped products, ground meat and products including ground meat, whole products, and the like.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the phrase "plant" or "plant product" includes any plant substance or plant-derived substance. Plant products include, but are not limited to, seeds, nuts, nut meats, cut flowers, plants or crops grown or stored in a greenhouse, house plants, and the like. Plant products include many animal feeds.

As used herein the term "poultry" refers to all forms of any bird kept, harvested, or domesticated for meat or eggs, and including chicken, turkey, ostrich, game hen, squab, guinea fowl, pheasant, quail, duck, goose, emu, or the like and the eggs of these birds. Poultry includes whole, sectioned, processed, cooked or raw poultry, and encompasses all forms of poultry flesh, by-products, and side products. The flesh of poultry includes muscle, fat, organs, skin, bones and body fluids and like components that form the animal. Forms of animal flesh include, for example, the whole or part of animal flesh, alone or in combination with other ingredients. Typical forms include, for example, processed poultry meat, such as cured poultry meat, sectioned and formed products, minced products, finely chopped products and whole products.

As used herein, the phrase "poultry debris" refers to any debris, residue, material, dirt, offal, poultry part, poultry waste, poultry viscera, poultry organ, fragments or combinations of such materials, and the like removed from a poultry carcass or portion during processing and that enters a waste stream.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "soil" or "stain" refers to organic and/or inorganic soils such as a non-polar oily substance which may or may not contain particulate matter such as mineral clays, sand, natural mineral matter, carbon black, graphite, kaolin, environmental dust, dirt, etc., and food soil including proteinaceous soils, starchy soils, polysaccharides, fatty soils including saturated and unsaturated fatty soils, food particulate and matter, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

The terms "vehicle" or "car" as used herein, refer to any transportation conveyance including without limitation, automobiles, trucks, sport utility vehicles, buses, trucks, motorcycles, monorails, diesel locomotives, passenger coaches, small single engine private airplanes, corporate jet aircraft, commercial airline equipment, etc.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the invention include polyethylene terephthalate (PET) polystyrene polyamide.

The terms "water soluble" and "water dispersible" as used herein, means that the polymer is soluble or dispersible in water in the inventive compositions. In general, the polymer should be soluble or dispersible at 25° C. at a concentration of 0.0001% by weight of the water solution and/or water carrier, preferably at 0.001%, more preferably at 0.01% and most preferably at 0.1%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Hard Surface Cleaning Compositions

The hard surface cleaning compositions comprise an anionic surfactant, an amphoteric surfactant, and water. In a preferred embodiment, the hard surface cleaning compositions also comprise a nonionic surfactant. In a preferred embodiment, the hard surface cleaning compositions also comprise a pH modifier such as an alkalinity source and/or an acid source. The hard surface cleaning compositions can also comprise a variety of optional ingredients in some embodiments, including, but not limited to, a dye, a fragrance, solvent, oxidizer, and water conditioning agent. The hard surface cleaning compositions can be prepared as solid compositions or liquid compositions. The compositions can be prepared as concentrated compositions, which can be liquid or solid. The compositions can also be prepared as ready-to-use compositions (also referred to as "RTU" or "use solutions"), which are liquid and can be prepared directly at a use concentration or by diluting a concentrated composition. Preferably, the concentrated liquid cleaning compositions have a viscosity of about 100 cps or less.

Preferably, the hard surface cleaning compositions have a pH between about 1 and about 14, more preferably between about 5 and about 13.5, most preferably between about 7 and about 13. In a preferred embodiment, the hard surface cleaning compositions have a pH between about 8 and about 11.5 and can be used without personal protective equipment (PPE).

We found that in order to adequately wet many of the hard surfaces that exist today, it was necessary to further reduce the surface tension of the cleaning compositions. This provided the best soil removal properties for the cleaning compositions. Further, while contact angle can be specific to the type of surface, we found that it was preferable for the cleaning compositions to generally provide a surface contact angle of less than about 50°, more preferably less than about 45°, most preferably less than about 40° after contacting the surface for about 1 second or less. In a preferred embodiment, the hard surface cleaning compositions provide a surface contact angle of about 45° or less, more preferably of about 40° or less, most preferably of about 35° after contacting the surface for about 1 seconds to about 30 seconds.

In a preferred embodiment, the hard surface cleaning compositions provide a surface contact of less than about 50°, more preferably less than about 45°, most preferably about 40° or less on a luxury vinyl tile surface after about 1 to about 30 seconds.

In a preferred embodiment, the hard surface cleaning compositions provide a surface contact of less than about 50°, more preferably about 45° or less, most preferably about 40° or less on a linoleum surface after about 1 to about 30 seconds.

In a preferred embodiment, the hard surface cleaning compositions provide a surface contact of less than about 40°, more preferably less than about 35°, still more preferably less than about 30°, even more preferably less than about 25°, most preferably less than about 20° on a grout surface after about 1 to about 30 seconds.

We found that it has become more difficult to remove many soils, even with similar chemistry, from porous surfaces and surfaces which are hydrophobic. While not wishing to be bound by the theory, we believe that one mechanism which can employed is imbibition where the soil is displaced by chemistry having a lower surface free energy.

Thus, if the cleaning compositions have a lower surface free energy, then the soil can be displaced from the surface, including, even a porous surface or hydrophobic surface. In light of this, in a preferred embodiment, the cleaning compositions have a surface free energy lower than the hard surface substrates. For example, in a preferred embodiment, the cleaning compositions have a surface tension of less than about 28 dynes, more preferably less than about 27 dynes, still more preferably less than about 26 dynes, even more preferably about 25 dynes or less, and most preferably about 24 dynes or less.

Preferred embodiments of the hard surface cleaning compositions are described in Tables 1 (concentrated compositions) and 2 (RTU compositions) below.

TABLE 1

Exemplary Preferred Concentrated Compositions

| Ingredient | First Exemplary Range (wt. %) | Second Exemplary Range (wt. %) | Third Exemplary Range (wt. %) |
|---|---|---|---|
| Amphoteric Surfactant | 1-30 | 2-15 | 3-6 |
| Anionic Surfactant | 1-30 | 2-12 | 5-10 |
| Nonionic Surfactant | 0-30 | 0.1-5 | 0.5-2 |
| pH Modifier | 0-50 | 2-12 | 3-10 |
| Polycarboxylic Acid Polymer | 0-10 | 0.1-5 | 0.5-2 |
| Water | 10-95 | 55-90 | 60-85 |
| Optional Ingredients | 0-20 | 0.01-20 | 0.01-15 |

TABLE 2

Exemplary Preferred RTU Compositions

| Ingredient | First Exemplary Range (ppm) | Second Exemplary Range (ppm) | Third Exemplary Range (ppm) |
|---|---|---|---|
| Amphoteric Surfactant | 25-10,000 | 50-750 | 75-500 |
| Anionic Surfactant | 25-10,000 | 50-750 | 100-500 |
| Nonionic Surfactant | 0-10,000 | 1-1000 | 10-250 |
| pH Modifier | 0-10,000 | 50-750 | 75-600 |
| Polycarboxylic Acid Polymer | 0-5000 | 10-250 | 25-100 |
| Water | 95-99.9 wt.% | 96.5-99.9 wt.% | 98-99.5 wt.% |
| Optional Ingredients | 0-1000 | 1-750 | 5-500 |

In a preferred embodiment, the concentrated cleaning compositions can be diluted with water to form an RTU composition. Preferably, the concentrated cleaning compositions are diluted at a dose of between about 0.5 oz to about 2 oz of concentrated composition to about 1 gallon of water. In another embodiment, the concentrate compositions can be diluted through any suitable dispensing equipment.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

Amphoteric Surfactant

The hard surface cleaning compositions preferably comprise an amphoteric surfactant. In a preferred embodiment, the concentrated hard surface cleaning compositions comprise between about 1 wt. % and about 30 wt. %, more preferably between about 2 wt. % and about 15 wt. %, and most preferably between about 3 wt. % and about 6 wt. % of an amphoteric surfactant. In a preferred embodiment, the RTU hard surface cleaning compositions comprise between about 25 ppm and about 10,000 ppm, more preferably between about 50 ppm and about 750 ppm, and most preferably between about 75 ppm and about 500 ppm of an amphoteric surfactant.

Preferred amphoteric surfactants for incorporation in the hard surface cleaning compositions include, amine oxides, betaines, sultaines, or a mixture thereof.

Amine oxides are tertiary amine oxides corresponding to the general formula:

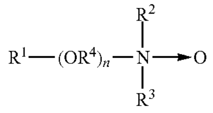

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide. Preferably, the amine oxide is water soluble.

Preferred water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide. Preferred amine oxide surfactants include, but are not limited to, linear or branched, alkoxylated or unalkoxylated C8-C18 amine oxides.

Betaine surfactants preferably are of the general structure:

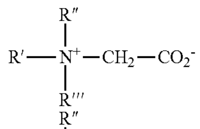

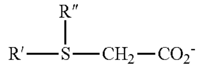

-continued

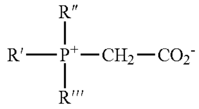

wherein R' comprises an alkyl, alkenyl, or hydroxyalkyl radical of from 8 to 18 carbon atoms having from 0 to 10 ethylene oxide moieties and from 0 to 1 glyceryl moiety; R" is an alkyl or monohydroxy alkyl group containing 1 to 6 carbon atoms, and R'" is an alkylene or hydroxy alkylene or hydroxy alkylene of from 1 to 4 carbon atoms.

These surfactant betaines typically do not exhibit strong cationic or anionic characters at pH extremes nor do they show reduced water solubility in their isoelectric range. Preferred betaines include, but are not limited to, amide betaines. Examples of preferred betaines include, but are not limited to, coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Suitable sultaines can include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

Anionic Surfactant

The hard surface cleaning compositions preferably comprise an anionic surfactant. Anionic surfactants are surface active substances which are categorized by the negative charge on the hydrophile; or surfactants in which the hydrophilic section of the molecule carries no charge unless the pH is elevated to the pKa or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. In a preferred embodiment the surfactant is an anionic sulfonated, sulfated, or carboxylated surfactant.

In a preferred embodiment, the at least one surfactant is an anionic sulfonated surfactant. Anionic sulfonated surfactants suitable for use in the compositions also include alkyl sulfonates, the linear and branched primary and secondary alkyl sulfonates, and the aromatic sulfonates with or without substituents; sulfonates can include sulfonated carboxylic acid esters. In a preferred embodiment, suitable alkyl sulfonate surfactants include linear or branched C8-C22 alkylbenzene sulfonates, or C10-C22 alkyl sulfonates. In an exemplary aspect, the anionic alkyl sulfonate surfactant is linear alkyl benzene sulfonic acid (LAS), an alkyl olefin sulfonate (such as alpha olefin sulfonate), or a mixture thereof.

In a preferred embodiment, the at least one surfactant is an anionic sulfated surfactant. Anionic sulfated surfactants suitable for use in the compositions also include alkyl ether sulfates, alkyl sulfates (preferably C8-C18 alkyl sulfates), the linear and branched primary and secondary alkyl sulfates (preferably C8-C18), alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). In some cases, the alkylene oxide bridge can be propylene oxide rather than, or in addition to ethylene oxide.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

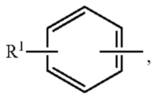
, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

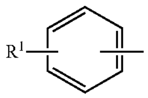

and $R^1$ is a $C_6$-$C_{12}$ alkyl group. In still yet other embodiments, $R^1$ is a $C_9$ alkyl group, n is 10 and m is 1. Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

The hard surface cleaning compositions preferably comprise an anionic surfactant. In a preferred embodiment, the concentrated hard surface cleaning compositions comprise between about 1 wt. % and about 30 wt. %, more preferably between about 2 wt. % and about 12 wt. %, and most preferably between about 5 wt. % and about 10 wt. % of an anionic surfactant. In a preferred embodiment, the RTU hard surface cleaning compositions comprise between about 25 ppm and about 10,000 ppm, more preferably between about 50 ppm and about 750 ppm, and most preferably between about 100 ppm and about 500 ppm of an anionic surfactant.

Nonionic Surfactant

The hard surface cleaning compositions optionally comprise a nonionic surfactant. In a preferred embodiment comprising a nonionic surfactant, the concentrated hard surface cleaning compositions comprise between about 0.01 wt. % and about 30 wt. %, more preferably between about 0.1 wt. % and about 5 wt. %, and most preferably between about 0.5 wt. % and about 2 wt. % of a nonionic surfactant. In a preferred embodiment comprising a nonionic, the RTU hard surface cleaning compositions comprise between about 0.1 ppm and about 10,000 ppm, more preferably between about 1 ppm and about 1000 ppm, and most preferably between about 10 ppm and about 250 ppm of a nonionic surfactant.

Preferred nonionic surfactants include alkoxylated surfactants. Suitable nonionic surfactants can include, but are not limited to, alkoxylated surfactants. Alkoxylated may comprise ethylene, propylene, butylene oxide, or mixtures thereof. Preferred alkoxylated surfactants have between about 8 carbons and about 18 carbons and can be linear or branched. Preferred alkoxylated surfactants include EO/PO copolymers, capped EO/PO copolymers, alcohol alkoxylates, capped alcohol alkoxylates, extended alkoxylates, mixtures thereof.

pH Modifier

In some embodiments, the hard surface cleaning compositions can optionally comprise a pH modifier. The pH modifier chosen can be based on the desired pH of the compositions. In another aspect of the invention, a pH modifier can be as a neutralizer. Suitable pH modifiers include an acid source, an alkalinity source, or a mixture thereof.

Acid Source

In some embodiments, the hard surface cleaning compositions can optionally include an acid source. In some embodiments of the invention, a cleaning composition can have an acidic pH. In such an embodiment, the pH is preferably between 3 and 7. In another aspect of the invention, the acid source can be included as a pH modifier or neutralizer in a basic composition to achieve a desired pH.

Suitable acid sources, can include, organic and/or inorganic acids. Examples of suitable organic acids include carboxylic acids such as but not limited to hydroxyacetic (glycolic) acid, citric acid, formic acid, acetic acid, propionic acid, butyric acid, valeric acid, caproic acid, trichloroacetic acid, urea hydrochloride, and benzoic acid, among others. Organic dicarboxylic acids such as oxalic acid, malonic acid, gluconic acid, itaconic acid, succinic acid, glutaric acid, maleic acid, fumaric acid, adipic acid, and terephthalic acid among others are also useful in accordance with the invention. Any combination of these organic acids may also be used intermixed or with other organic acids which allow adequate formation of the composition of the invention.

Inorganic acids useful in accordance with the invention include sulfuric acid, sulfamic acid, methylsulfamic acid, hydrochloric acid, hydrobromic acid, and nitric acid among others. These acids may also be used in combination with other inorganic acids or with those organic acids mentioned above. In a preferred embodiment, the acid is an inorganic acid.

If included in the concentrated hard surface cleaning composition, the acid source is preferably in a concentration between about 0.01 wt. % and about 10 wt. %, more preferably between about 0.1 wt. % and about 8 wt. %. If included in the RTU hard surface cleaning composition, the acid source is preferably in a concentration between about 0.1 ppm and about 1000 ppm, more preferably between about 1 ppm and about 500 ppm.

Alkalinity Source

The cleaning compositions can optionally include an alkalinity source. Suitable alkalinity sources include weak bases and strong bases. In a preferred embodiment, the hard surface cleaning compositions comprise both a weak base and a solid base. Examples of suitable alkalinity sources of the cleaning composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Exemplary alkali metal carbonates that can be used include, but are not limited to, sodium carbonate, potassium carbonate, bicarbonate, sesquicarbonate, and mixtures thereof. Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

In general, alkalinity sources are commonly available in either aqueous or powdered form. The alkalinity can be added to the composition in any form known in the art, including as solid beads, granulated or particulate form, dissolved in an aqueous solution, or a combination thereof.

The alkalinity source can be included in the hard surface cleaning compositions in any amount needed to achieve the desired pH of the compositions. In a preferred embodiment, the concentrated hard surface cleaning compositions comprise between about 0 wt. % and about 50 wt. %, more preferably between about 2 wt. % and about 12 wt. %, and most preferably between about 3 wt. % and about 10 wt. % of an alkalinity source. In a preferred embodiment, the RTU hard surface cleaning compositions comprise between about 0 ppm and about 10,000 ppm, more preferably between about 50 ppm and about 750 ppm, and most preferably between about 75 ppm and about 600 ppm of an alkalinity source.

Water Conditioning Agent

In some embodiments, the hard surface cleaning compositions can optionally comprise a water conditioning agent. Preferred water conditioning agents, include, but are not limited to aminocarboxylates, condensed phosphates, phosphonates, polycarboxylic acid polymers, or a mixture thereof Preferred aminocarboxylates include, but are not limited to, ethylenediaminetetra-acetates (EDTA), glutamic-N,N-diacetic acid (GLDA) N-hydroxyethylethylenediaminetriacetates (HEDTA), methyl-glycine-diacetic acid (MGDA), nitrilo-triacetates (NTA), ethylenediamine tetrapro-prionates, triethylenetetraaminehexacetates, diethylenetriaminepentaacetates, and ethanoldi-glycines, salts and derivatives of the foregoing, alkali metal, ammonium, and substituted ammonium salts therein and mixtures thereof.

Preferred condensed phosphates include, but are not limited to, sodium and potassium orthophosphate, sodium and potassium pyrophosphate, sodium tripolyphosphate, sodium hexametaphosphate, and the like.

Preferred phosphonates, include, but are not limited to, 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt

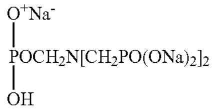

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used.

Suitable polycarboxylic acid polymer can be a homopolymer, copolymer, and/or terpolymer comprising polyacrylic acid, polymaleic acid, or a combination thereof. Preferred polycarboxylic acid polymers include a polyacrylic acid polymer having a weight average molecular weight of about 1,000 to about 100,000, a modified polyacrylic acid polymer having a weight average molecular weight of about 1,000 to about 100,000, or a polymaleic acid polymer having a weight average molecular weight of about 500 to about 5,000. In a most preferred embodiment, the water conditioning agent comprises a polycarboxylic acid polymer comprising a polymaleci acid polymer.

Examples of a suitable polycarboxylic acid polymer include: polyacrylic acid polymers, polyacrylic acid polymers modified by a fatty acid end group ("modified polyacrylic acid polymers"), and polymaleic acid polymers. Examples of suitable polyacrylic acid polymers and modified polyacrylic acid polymers include those having a weight average molecular weight of about 1,000 to about 100,000. Examples of suitable polymaleic acid polymers include those having a weight average molecular weight of about 500 to about 5,000. Suitable polycarboxylic acid polymers are available under the trade name Acusol, available from Rohm & Haas LLC, Philadelphia, Pa. and Belclene, available from Houghton Chemical Corporation, Boston, Mass.

The hard surface cleaning compositions optionally comprise a polycarboxylic acid polymer. In a preferred embodiment comprising a polycarboxylic acid polymer, the concentrated hard surface cleaning compositions comprise between about 0.01 wt. % and about 10 wt. %, more preferably between about 0.1 wt. % and about 5 wt. %, and most preferably between about 0.5 wt. % and about 2 wt. % of a polycarboxylic acid polymer. In a preferred embodiment comprising a nonionic, the RTU hard surface cleaning compositions comprise between about 0.1 ppm and about 5000 ppm, more preferably between about 1 ppm and about 250 ppm, and most preferably between about 10 ppm and about 100 ppm of a polycarboxylic acid polymer.

Additional Optional Ingredients

In embodiments of the invention, additional ingredients can be included in the hard surface cleaning compositions. The additional ingredients provide desired properties and functionalities to the compositions. For the purpose of this application, the term "functional ingredient" includes a material that provides a beneficial property in a particular use. Some particular examples of functional materials are discussed in more detail below, although the particular materials discussed are given by way of example only, and that a broad variety of other functional ingredients may be used. Examples of such a functional materials include, but are not limited to, a dye, a fragrance, an oxidizer, a solvent, or mixtures thereof. A broad variety of other functional materials may also be included or excluded depending upon the desired characteristics and/or functionality of the composition. In a preferred embodiment, the compositions are substantially free of, or entirely free of, one or more of the following: cationic surfactants, silicon-based polymers and surfactants, foam boosters, ionic salts, and/or rheology modifiers.

In the context of some embodiments disclosed herein, the functional materials, or ingredients, are optionally included within the hard surface cleaning compositions for their functional properties. Some more particular examples of functional materials are discussed in more detail below, but it should be understood by those of skill in the art and others that the particular materials discussed are given by way of example only, and that a broad variety of other functional materials may be used.

The amount of a particular optional functional ingredient can vary depending on the nature of the ingredient and property intended for the composition. Despite this it is generally expected that the concentrated hard surface cleaning compositions comprise between 0 wt. % and about 20 wt. %, about 0.01 wt. % and about 20 wt. %, 0.01 wt. % and about 15 wt. % additional functional ingredients. Similarly, in an RTU hard surface cleaning compositions comprise between 0 ppm and about 1000 ppm, about 0.1 ppm and about 1000 ppm, 1 ppm and about 750 ppm, 5 ppm and about 500 ppm additional functional ingredients.

Dyes

The hard surface cleaning compositions can optionally comprise a dye or colorant. Various dyes and other aesthetic enhancing agents can be included in the hard surface cleaning compositions. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Liquitint Green 1054, and the like.

If included in the concentrated hard surface cleaning composition, a dye is preferably in a concentration between about 0.001 wt. % and about 5 wt. %, more preferably between about 0.01 wt. % and about 2 wt. %. If included in the RTU hard surface cleaning composition, a dye is preferably in a concentration between about 0.0001 ppm and about 100 ppm, more preferably between about 0.001 ppm and about 50 ppm.

Fragrances

The hard surface cleaning compositions can optionally comprise a fragrance. Various fragrances, odorants, perfumes, and other odor enhancing agents can be included in the hard surface cleaning compositions. Preferred fragrances include, but are not limited to, terpenoids such as citronellol, aldehydes such as amyl cinnamaldehyde, a jasmine such as C1S-jasmine or jasmal, vanillin, fruit fragrances whether natural or synthetic, vegetable fragrances whether natural or synthetic, herb or spice fragrances whether natural or synthetic, and the like.

If included in the concentrated hard surface cleaning composition, a fragrance is preferably in a concentration between about 0.01 wt. % and about 5 wt. %, more preferably between about 0.1 wt. % and about 2 wt. %. If included in the RTU hard surface cleaning composition, a fragrance is preferably in a concentration between about 0.01 ppm and about 200 ppm, more preferably between about 0.1 ppm and about 100 ppm.

Oxidizer

The hard surface cleaning compositions can optionally include an oxidizer. If included in the concentrated hard surface cleaning compositions, the oxidizer is preferably in a concentration between about 0 wt. % and about 10 wt. %, more preferably between about 0.1 wt. % and about 7 wt. %.

Oxidizers can be used for lightening or whitening a substrate and can include active oxygen compounds and bleaching compounds capable of liberating an active halogen species, such as $Cl_2$, $Br_2$, $—OCl^-$ and/or $—OBr^-$, or the like, under conditions typically encountered during the cleansing process. Suitable active oxygen compounds can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. Suitable bleaching compounds can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). Preferred oxidizers include, but are not limited to, peroxide-based oxidizers, chlorine-based oxidizers, or a combination thereof.

Solvent

The hard surface cleaning compositions can optionally include a solvent. If included in the concentrated hard surface cleaning compositions, the solvent is preferably in a concentration between about 0 wt. % and about 20 wt. %. Preferred solvents include, but are not limited to, organic solvents including, but not limited to diols, polyols, aromatic alcohols, and mixtures thereof.

In a preferred embodiment, the solvent is a hydrophobic oxygenated solvent. Exemplary solvents and solvent systems include limited water-solubility alcohols. In an aspect, a benzyl alcohol solvent and/or solvent system is employed. In a further aspect, a phenoxyethanol solvent and/or solvent system is employed. Without being limited to a particular mechanism of action, in some embodiments, the solvent provides a limited water solubility alcohol providing hydrophobicity that adds affinity towards greasy soils and acts as a plasticizer.

Additional suitable solvents and solvent systems may include one or more different solvents including aromatic alcohols, ether amines, amidines, esters, glycol ethers, and mixtures thereof. Representative glycol ether solvents may include aromatic glycol ether solvents, such as ethylene glycol phenyl ether (commercially available from Dow as Dowanol Eph) or diethylene glycol phenyl ether (commercially available as Dowanol DiEPh). Additional suitable glycol ether solvents may include, without limitation, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, further comprises a buffering agent, a cosolvent, a coupling agent, a defoaming agent, a dye, a fragrance, a foaming agent, a hydrotrope, a pH adjusting agent, a solubilizer, an additional surfactant, a wetting agent, or mixture thereof CELLOSOLVE™, DOWANOL PPH™, DOWANOL TPnB™ EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL acetate, Methyl PROPASOL™, Propyl CARBITOL™, Propyl CELLOSOLVE™, Propyl DIPROPASOL™, and/or Propyl PROPASOL™.

Additional suitable solvents may include 1,8-Diazabicyclo[5.4.0]undec-7-ene, or also may be referred to as 2,3,4,6,7,8,9,10-Octahydropyrimidol[1,2-a]azepine (or DBU), 2.5.7.10-tetraoxaundecante (TOU), acetamidophenol, acetanilide, acetophenone, 2-acetyl-1-methylpyrrole, ethyl hexyl glycerine, benzyl acetate, benzyl alcohol, methyl benzyl alcohol, alpha phenyl ethanol, benzyl benzoate, benzyloxyethanol, ethylene glycol phenyl ether, a propylene glycol, propylene glycol phenyl ether, amyl acetate, amyl alcohol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether, dipropylene glycol n-propyl ether, tripropylene glycol n-propyl ether, dipropylene glycol n-butyl ether, tripropylene glycol n-butyl ether, diethylene glycol n-butyl ether acetate, diethylene glycol monobutyl ether, ethylene glycol n-butyl ether acetate, ethylene glycol monobutyl ether, dipropylene glycol monobutyl ether, propylene glycol monobutyl ether, ethyl 3-ethoxypropionate, 2,2,4-Trimethyl-1,3-Pentanediol Monoisobutyrate, diethylene glycol monohexyl ether, ethylene glycol monohexyl ether, diethylene glycol monomethyl ether, diethylene glycol monoethyl ether, ethylene glycol methyl ether acetate, ethylene glycol monomethyl ether, dipropylene glycol monomethyl ether, propylene glycol methyl ether acetate, propylene glycol monomethyl ether, diethylene glycol monopropyl ether, ethylene glycol monopropyl ether, dipropylene glycol monopropyl ether and propylene glycol monopropyl ether. Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate. Additional solvents include glycerin and glycerin mono alkyl ethers such as mono heptyl glycerin, and 1,2 alkane diols such as 1,2 octane diol.

In a preferred embodiment, the solvent is one or more of benzyl alcohol and/or a solvent from the Dowanol E series and/or Dowanol P series.

Methods of Making the Hard Surface Cleaning Compositions

The hard surface cleaning compositions can be prepared by any suitable method of preparation depending on the type of product to be prepared (i.e., liquid, solid, concentrated or use solution). For example, liquid compositions can typically be made by forming the ingredients in an aqueous liquid or aqueous liquid solvent system. Such systems are typically made by dissolving or suspending the active ingredients in water or in compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration.

In embodiments where the hard surface cleaning compositions are prepared as solid compositions, the solid compositions can include, but are not limited to granular and pelletized solid compositions, powders, solid block compositions, cast solid block compositions, extruded solid block composition, pressed solid compositions, and others.

Solid particulate cleaning compositions can be made by merely blending the dry solid ingredients formed according to the invention in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water-soluble film containers. Other suitable packaging for the composition includes flexible bags, packets, shrink wrap, and water-soluble film such as polyvinyl alcohol.

The solid cleaning compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the cleaning composition hardens to a solid form. The structure of the matrix may be characterized according to its hardness, melting point, material distribution, crystal structure, and other like properties according to known methods in the art. Generally, a solid cleaning composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids are combined under pressure. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 3000 psi, about 5 to about 2500 psi, or about 10 psi to about 2000 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of an optional curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the cleaning composition under the expected conditions of storage and use of the solid cleaning composition. In general, it is expected that the cleaning composition will remain in solid form when exposed to temperatures of up to approximately 100° F. and particularly up to approximately 120° F.

The resulting solid cleaning composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Methods of Using the Hard Surface Cleaning Compositions

While an understanding of the mechanism is not necessary to practice the hard surface cleaning compositions described herein, and while the present embodiments are not limited to any particular mechanism of action, it is contemplated that, in some embodiments, the hard surface cleaning compositions can be applied to a surface. In a preferred embodiment, the surface is rinsed after application of the cleaning composition to the surface. Preferably, the hard surface cleaning composition is in contact with the surface for any amount of time sufficient to remove soils from the surface. In some embodiments, the contact time is between about 30 seconds and 10 minutes, more preferably between about 1 minute and about 5 minutes.

The hard surface cleaning compositions can be applied to a surface in any desired manner suitable for the particular surface. For example, the hard surface cleaning compositions can be applied by pouring, spraying, wiping, and/or mopping. Other mechanisms of applying the hard surface cleaning compositions can be performed. In a preferred embodiment, the hard surface cleaning compositions can be dispensed from a dispenser into a container (e.g., a bottle or bucket), a cleaning substrate (e.g., a wipe, a mop, a sponge, and/or a rag) or dispensed directly to a surface for cleaning. Suitable dispensers can contain a concentrated composition or an RTU composition. In a preferred embodiment, a dispenser can both dilute a concentrated cleaning composition and dispense it as an RTU composition.

Preferably, the hard surface cleaning compositions can be applied to any suitable hard surface as defined herein. Preferred hard surfaces, include, but are not limited to floors, rails, counters, walls, chairs, stools, benches, doors, handles, doorknobs, and the like. In a preferred aspect of the invention, the hard surface cleaning compositions are suitable for cleaning a variety of surface materials, including, but not limited to, luxury vinyl tile, linoleum, tile, wood, stone, concrete, grout, laminate, porcelain, plastic, composite, and metal.

In a preferred aspect of the invention, the hard surface cleaning compositions remove a variety of soils, including, but not limited to food soils, cooking soils, and inorganic soils. More preferably, the hard surface cleaning compositions can remove inorganic soils such as a non-polar oily substance which may or may not contain particulate matter such as mineral clays, sand, natural mineral matter, carbon black, graphite, kaolin, environmental dust, dirt, etc., and food soil including proteinaceous soils, starchy soils, polysaccharides, fatty soils including saturated and unsaturated fatty soils, food particulate and matter, etc.

In a preferred embodiment, the hard surface cleaning compositions can remove at least about 50% of the soil on a surface, more preferably at least about 60% of the soil on a surface, still more preferably at least about 70% of the soil on a surface, even more preferably at least about 80% of the soil on a surface, still more preferably at least about 85% of the soil on a surface, even more preferably at least about 90% of the soil on a surface, still more preferably at least about 95% of the soil on a surface, even more preferably at least about 99% of the soil on a surface, and most preferably 100% of the soil on a surface.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the hard surface cleaning compositions and methods of using the same are further defined in the following non-limiting Examples. It should be understood that these Examples, while indicating one or more preferred embodiments, are given by way of illustration only and are non-limiting. From the above discussion and these Examples, one skilled in the art can ascertain the essential characteristics of the invention(s), and without departing from the spirit and scope thereof, can make various changes and modifications of the embodiments of the invention to adapt it to various usages and conditions. Thus, various modifications of the embodiments, in addition to those shown and described herein, will be apparent to those skilled in the art from the foregoing description. Such modifications are also intended to fall within the scope of the appended claims.

Materials Used:

ACUSOL® 445: A homopolymer of acrylic acid, available from Rohm and Haas.

ACUSOL® 448 (A448): A polyacrylic/polymaleic acid copolymer, available from Rohm and Haas.

BARLOX® 12 (B12): A cocoamine oxide surfactant, available from Lonza.

BELCLENE® 200: An aqueous solution of polymaleic acid, available from BWA Water Additives.

SURFONIC® L24-7 (L24-7): Linear $C_{12-14}$ alcohol ethoxylate, available from Huntsman.

TOMADOL® 1-5 (T1-5): An ethoxylated alcohol surfactant, available from Evonik.

Commercially available alkyl olefin sulfonate (AOS), alkyl polyglucoside (APG), linear alkylbenzene sulfonate (LAS), monoethanolamine (MEA), sodium hydroxide, and sodium laureth sulfate (SLES).

Example 1

The surface tension of various surfactants and surfactant combinations were screened. Measurement of surfactant kinetics to the liquid-air interface was conducted. This study was done at room temperature with 4000 ppm surfactant. The tests were performed with a 1:1 surfactant blend of amphoteric to anionic surfactant. The exemplary amphoteric surfactant was BARLOX® 12, an exemplary amine oxide. The anionic surfactant was varied and included alpha olefin sulfonate, linear alkylbenzene sulfonate, sodium lauryl ether sulfate, each in combination with the amine oxide. A control anionic-only was also tested employing alpha olefin sulfonate. Additional testing was performed to evaluate the impact and compatibility of inclusion of an exemplary nonionic surfactant—the exemplary nonionic surfactant was an alcohol ethoxylate. Where a nonionic surfactant was also included, the surfactant blend was at a 1:1:1 ratio of anionic to amphoteric to nonionic surfactant. The results of this testing are shown in FIG. 1.

As shown in the results of FIG. 1, the combination of amphoteric surfactant with an anionic surfactant achieved a lower surface tension by about 10 mN/m than the anionic alone. This example shows the synergy of anionic and amphoteric surfactants to reach 24 dynes in less than 10 seconds. These results show the efficacious reduction in surface tension of surfactant combinations having at least one anionic surfactant and at least one amphoteric surfactant. Further, this testing demonstrates that inclusion of a nonionic surfactant did not significantly impact the final surface tension value; however, it was found that the inclusion of a nonionic surfactant helped achieve a lower surface tension at a faster time. Thus, a nonionic surfactant is compatible and can be included in the hard surface cleaning compositions and may be part of a preferred embodiment to achieve a low surface tension at a faster rate.

Example 2

Figure 2A:
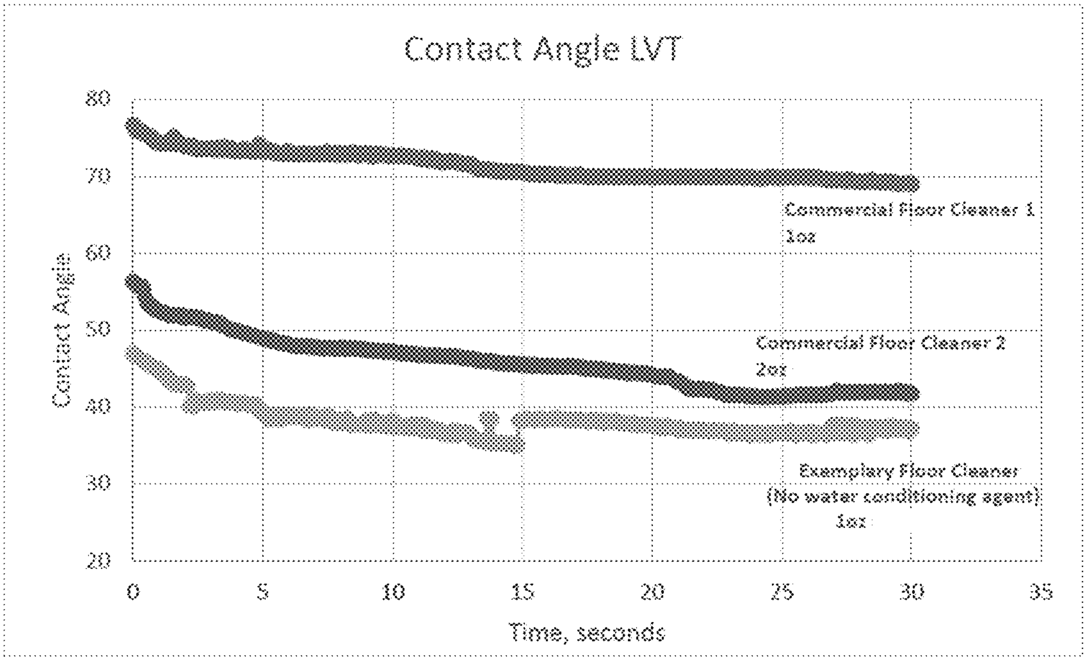
FIG. 2A shows a comparison of the contact angle of two commercial floor cleaner products in comparison to an exemplary floor cleaner composition on luxury vinyl tile.
Figure 2B:
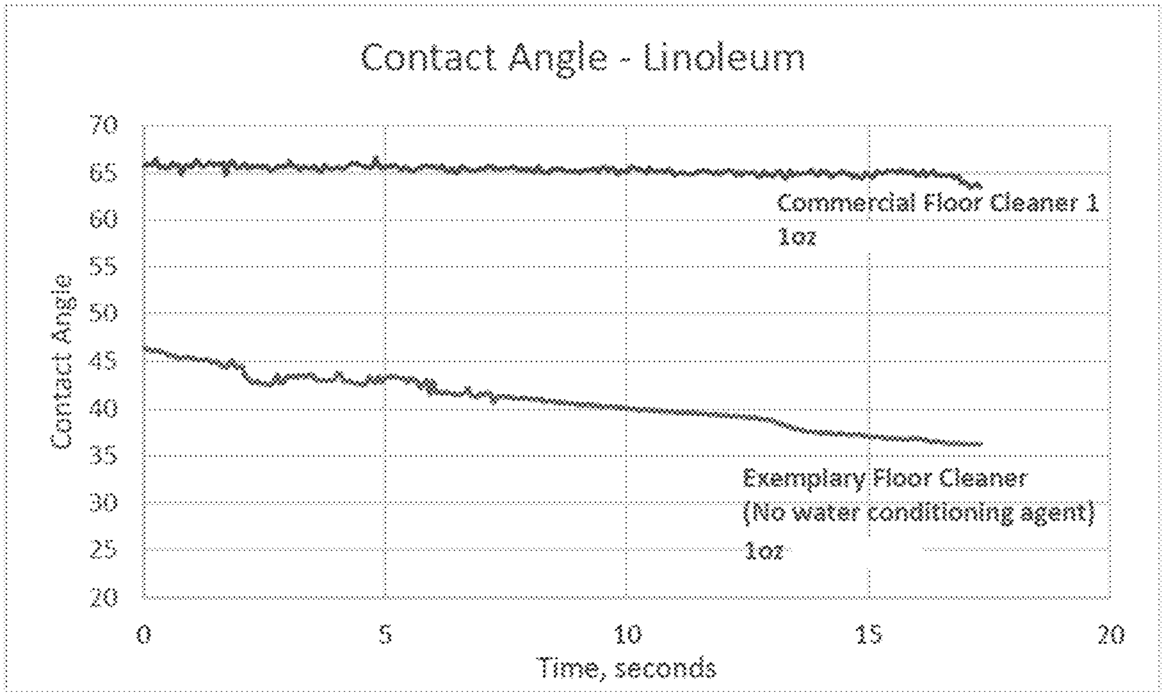
FIG. 2B shows a comparison of the contact angle of a commercial floor cleaner product in comparison to an exemplary floor cleaner composition on linoleum.
Figure 2C:
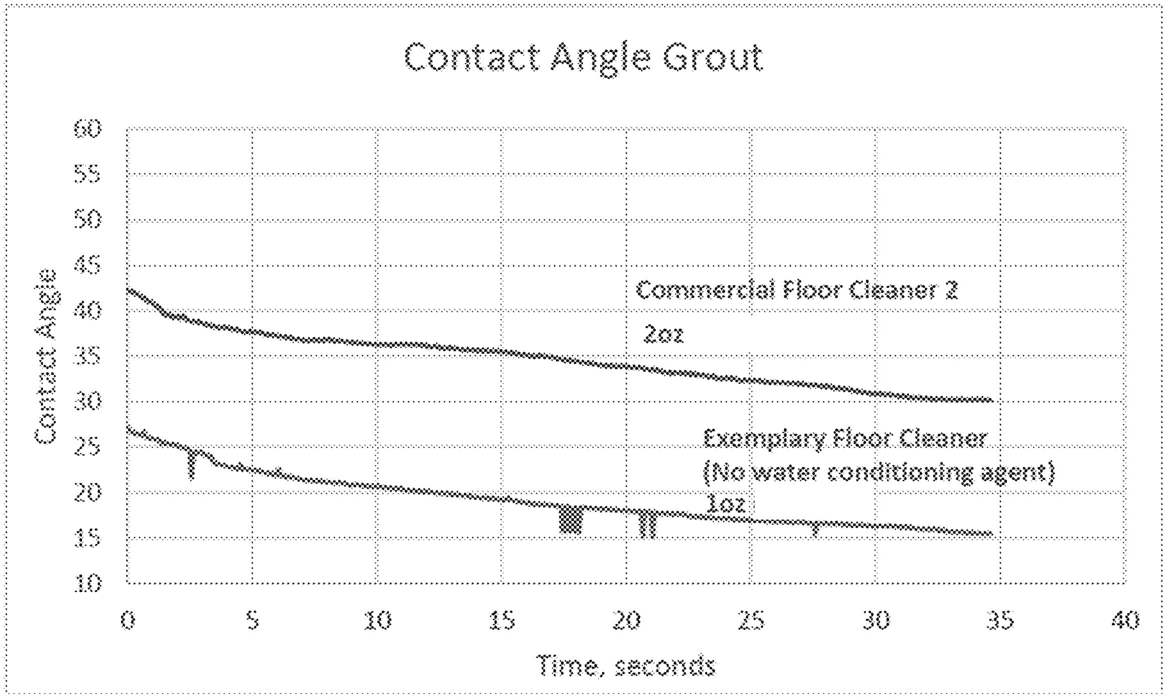
FIG. 2C shows a comparison of the contact angle of a commercial floor cleaner product in comparison to an exemplary floor cleaner composition on grout.

Various floor cleaner compositions were evaluated by measuring the contact angle of the compositions with respect to time. An exemplary hard surface cleaning composition of the present application without a water conditioning agent ("Exemplary Floor Cleaner composition") was compared against two different commercial floor cleaner products. Commercial Floor Cleaner 1 is an alkaline floor cleaner composition utilizing a nonionic surfactant, and Commercial Floor Cleaner 2 is a floor cleaner composition utilizing an amphoteric and nonionic surfactant, but without an anionic surfactant. The floor cleaners were tested on luxury vinyl tile (LVT), linoleum, and grout. The contact angle results are shown in FIG. 2A, FIG. 2B, and FIG. 2C. The lower the contact angle, the more favorable the wetting properties of the surfactant composition.

As shown in the figures, the Exemplary Floor Cleaner composition with no water conditioning agent demonstrated a drastically lower contact angle than the Commercial Floor Cleaner compositions on LVT, linoleum, and grout. These results confirm that not only do the compositions of the present invention have lower surface tension, but they also demonstrate lower contact angle on various soiled hard surfaces.

Figure 3:
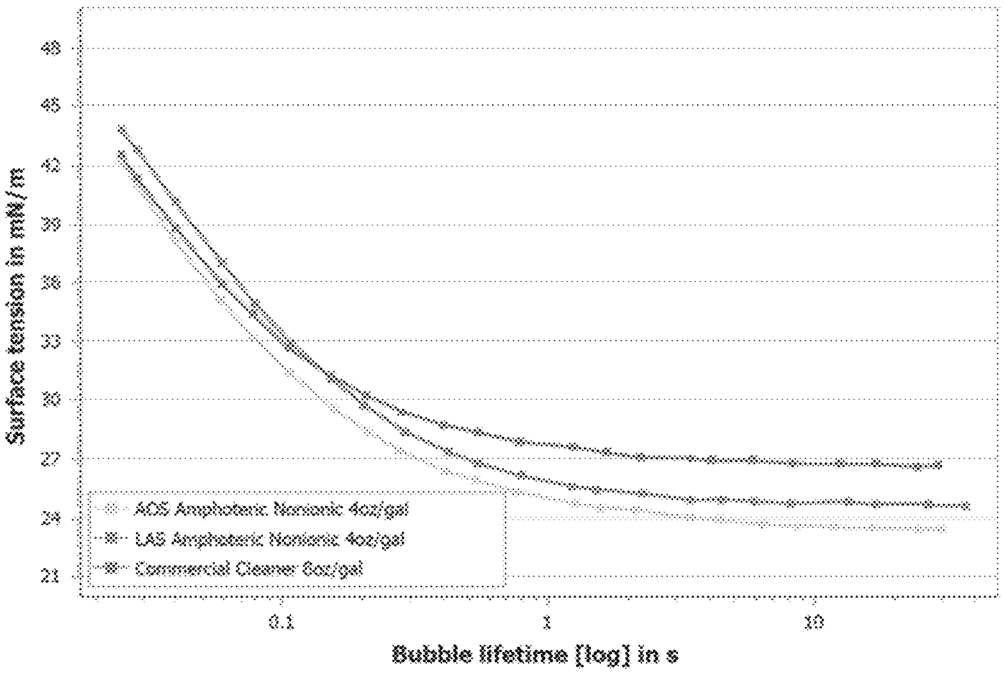
FIG. 3 shows two exemplary hard surface cleaning compositions of the present application compared against a commercially available all-purpose hard surface cleaning composition to evaluate the dynamic surface tension of the compositions.

Additional testing was performed to evaluate two exemplary hard surface cleaning compositions of the present application compared against a commercially available all-purpose hard surface cleaning composition to evaluate the dynamic surface tension of the compositions. The two exemplary hard surface cleaning compositions were prepared with a 1:1:1 ratio of anionic surfactant, amphoteric surfactant and nonionic surfactant. The exemplary amphoteric surfactant employed was BARLOX® 12. The exemplary nonionic surfactant employed was an alcohol ethoxylate. The anionic surfactant species differed between the two test compositions, one employing alpha olefin sulfonate and the other employing an alkyl ether sulfate. The exemplary commercially available all-purpose hard surface cleaner comprising cleaning solvents, anionic surfactants, and nonionic surfactants which is intended for heavy duty cleaning on difficult industrial soils. The results of this testing are shown in FIG. 3. As can be seen in FIG. 3, the two exemplary hard surface cleaning compositions had consistently lower dynamic surface tension measurements than the existing commercial product demonstrating that the exemplary hard surface cleaning compositions comprising an amphoteric surfactant and anionic surfactant (and preferably a nonionic surfactant) kinetically outperform existing compositions comprised of anionic and nonionic surfactants by providing lower surface tension at a lower concentration.

Example 3

A food soil composition was prepared from lard and corn oil in a 1:1 ratio with Sudan dye (for color) (referred to as "red soil composition" throughout the Examples). The red soil composition mimics semi-solid fatty soils found on surfaces such as in back of house (BOH) work areas.

An industrial hydrocarbon-based oily soil was prepared from motor oil and diacylglycerol oil in a 9:1 ratio (referred to as "black soil composition" throughout the Examples). The black soil composition mimics soils and oils found on surfaces such as at front of house (FOH) work areas.

Vinyl tile substrates soiled with red soil composition were prepared, and tiles soiled with black soil composition were prepared. The tiles were soiled with approximately 0.15 grams of either the red soil composition or black soil composition. The tiles were soaked in use solutions of various cleaner compositions diluted with water having a water hardness of 5 gpg (grains per gallon). The tiles with red soil were soaked with the various cleaning compositions for 24 hours at room temperature. The tiles with black soil were soaked with the various cleaning compositions for 30 minutes at room temperature.

Figure 4A:
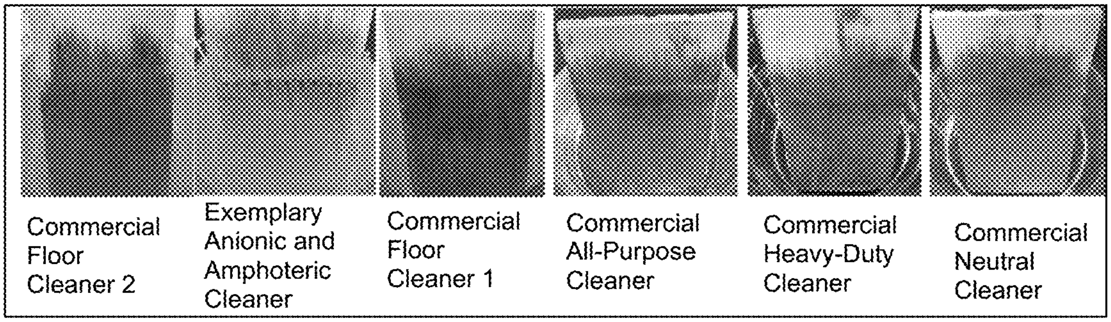
FIG. 4A shows a comparison of the efficacy of various cleaning compositions on greasy soil removal as shown by the removal of a red soil composition on soiled vinyl tiles.
Figure 4B:
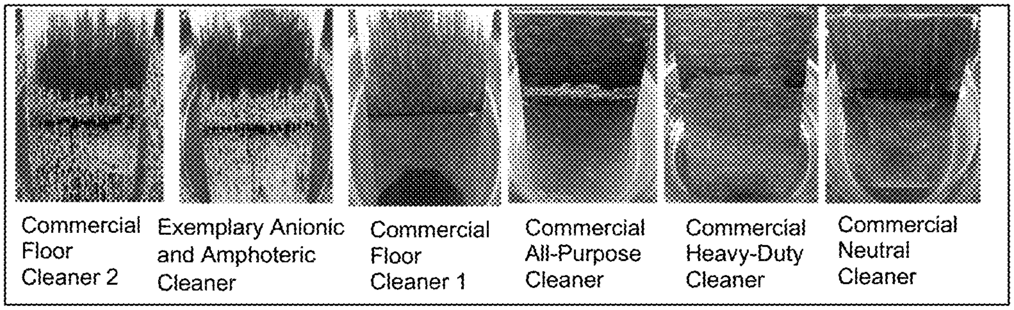
FIG. 4B shows a comparison of the efficacy of various cleaning compositions on hydrocarbon and soot soil removal as shown by the removal of a black soil composition on soiled vinyl tiles.

The various cleaning compositions tested included Commercial Floor Cleaner 1 and Commercial Floor Cleaner 2 from Example 3, an Exemplary Anionic and Amphoteric Cleaner (an exemplary hard surface cleaner of the invention), Commercial All-Purpose Cleaner (a floor and all-purpose cleaner containing anionic surfactant), Commercial Heavy-Duty Cleaner (a heavy-duty cleaner containing anionic surfactant), and Commercial Neutral Cleaner (a nonionic surfactant based cleaner) were evaluated. The Exemplary Anionic and Amphoteric Cleaner was diluted at a concentration of 1 oz per gallon. The various other commercial cleaners were evaluated and diluted at their recommended dosages for cleaning. The results showing the amount of soil removed are shown in FIG. 4A and FIG. 4B. A summary of the soil removal efficacy of the various cleaners evaluated are shown in Table 3.

TABLE 3

| Formulation | Red Soil Composition (Oily Greasy Soils) | Black Soil Composition (Hydrocarbon/Soot Soils) |
|---|---|---|
| Commercial Floor Cleaner 2 | Not Observed | Oil Displacement/ Emulsion |
| Commercial Floor Cleaner 1 | Not Observed | Not Observed |
| Exemplary Anionic and Amphoteric Cleaner | Oil Displacement/ Emulsion | Oil Displacement/ Emulsion |
| Commercial All-Purpose Cleaner | Not Observed | Not Observed |
| Commercial Heavy-Duty Cleaner | Not Observed | Not Observed |
| Commercial Neutral Cleaner | Not Observed | Not Observed |

As shown in the results in FIGS. 4A and 4B, and Table 3, only the exemplary hard surface cleaner containing an anionic and amphoteric surfactant combination demonstrated oil displacement or an emulsion on both the red soil composition and black soil composition. These results demonstrate the efficacy of the exemplary hard surface cleaning composition for removal of both oily/greasy soils and hydrocarbon/soot soils on a variety of substrates.

Figure 4C:
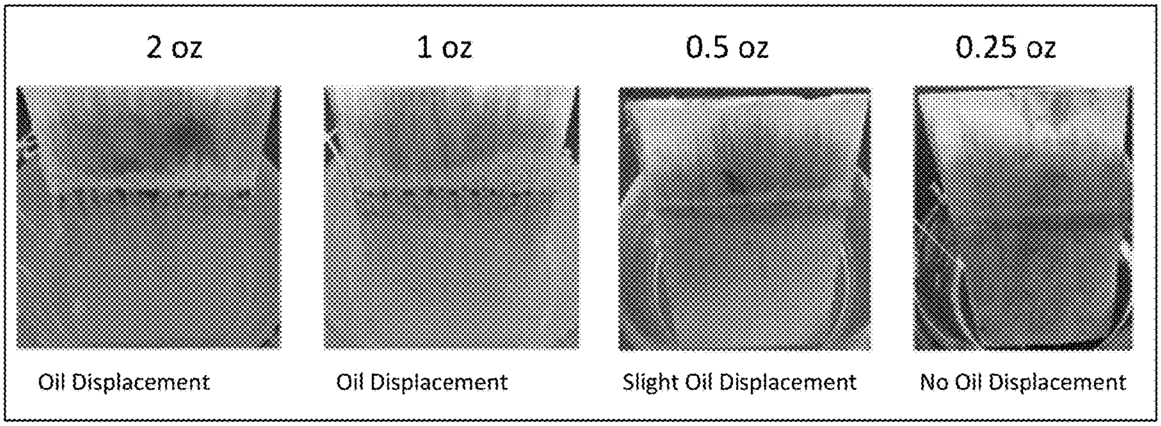
FIG. 4C shows the efficacy of an exemplary floor cleaning composition on greasy soil removal with respect to concentration.

Further, an exemplary hard surface cleaning composition was evaluated for its efficacy against greasy soil removal. Tiles soiled with the red soil composition were prepared and treated with an exemplary hard surface cleaning composition at concentrations of 2 oz, 1 oz, 0.5 oz, and 0.25 oz. The results are shown in FIG. 4C. As shown in FIG. 4C, both concentrations of 2 oz and 1 oz of the exemplary floor cleaner composition demonstrated oil displacement. There was slight oil displacement at a concentration of 0.5 oz, and no oil displacement at a concentration of 0.25 oz. These results demonstrate that the dilution of the cleaning composition may have an impact on greasy soil removal, with increased greasy soil removal at higher concentrations.

Example 4

Figure 5:
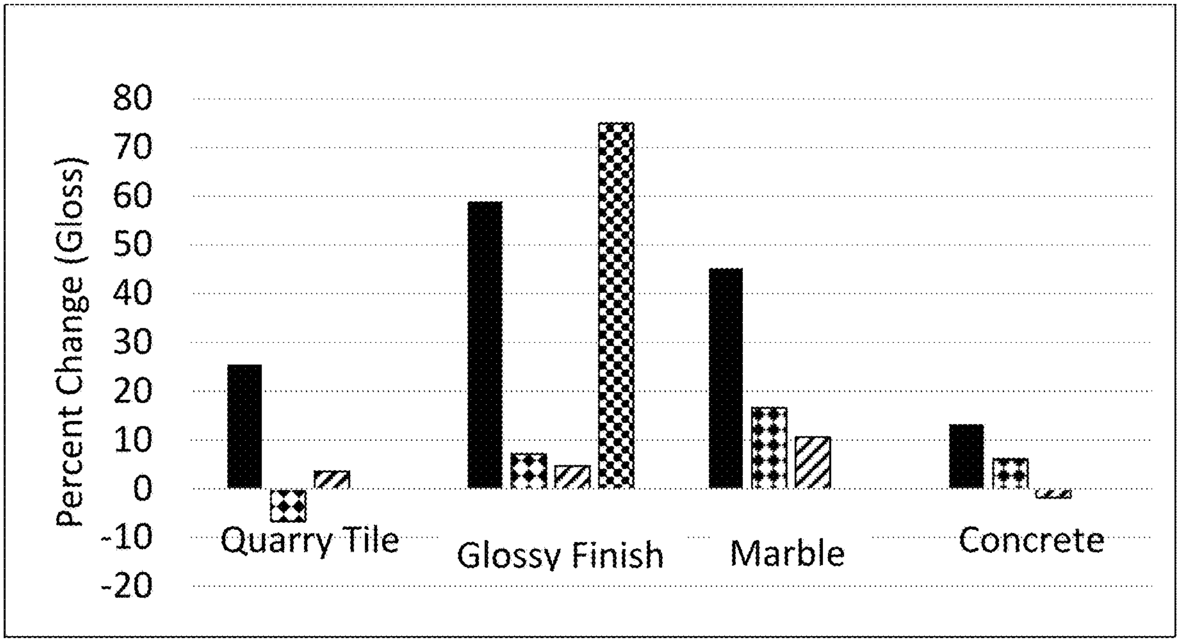
FIG. 5 shows a graphical representation of the percent change in gloss of various hard surface substrates after being contacted with various floor cleaner compositions where the solid black bars represent Commercial Floor Cleaner 1, the bars with a diamond-shaped pattern represent Commercial Floor Cleaner 2, the bars with diagonal lines represent Exemplary Floor Cleaner 1, and the bar with a square-checkered pattern represents Exemplary Floor Cleaner 2.

Floor cleaner compositions were evaluated on various types of floors to determine the floor compatibility of the floor cleaner compositions by measuring the gloss index. The percent change in gloss was measured for each of the floor cleaner compositions. The floor cleaner compositions tested include Commercial Cleaner 1 and 2 from Example 3, as well as Exemplary Floor Cleaners 1 and 2. Exemplary Floor Cleaner 1 represents an exemplary hard surface cleaning composition of the present application which comprises a water conditioning agent; Exemplary Floor Cleaner 2 represents an exemplary hard surface cleaning composition of the present application which does not contain a water conditioning agent. These floor cleaner compositions were tested on quarry tile, glossy floor finish, marble, and concrete. The gloss index results are shown in FIG. 5. The percent change in gloss measures the difference in gloss appearance after cleaning. Therefore, a lower percent change demonstrates good soil removal and retention of the gloss appearance after cleaning.

As shown in FIG. 5, Exemplary Floor Cleaner 1 demonstrated the lowest percent change in gloss overall on the tested floor substrates. Due to the high percent change in gloss after applying Exemplary Floor Cleaner 2, the composition was only tested on the glossy floor finish. Therefore, as demonstrated in FIG. 5, the exemplary formula with the water conditioning agent was most preferred for use on diverse floor substrates as it demonstrated the best soil removal and retention of gloss properties.

Example 5

Figure 6:
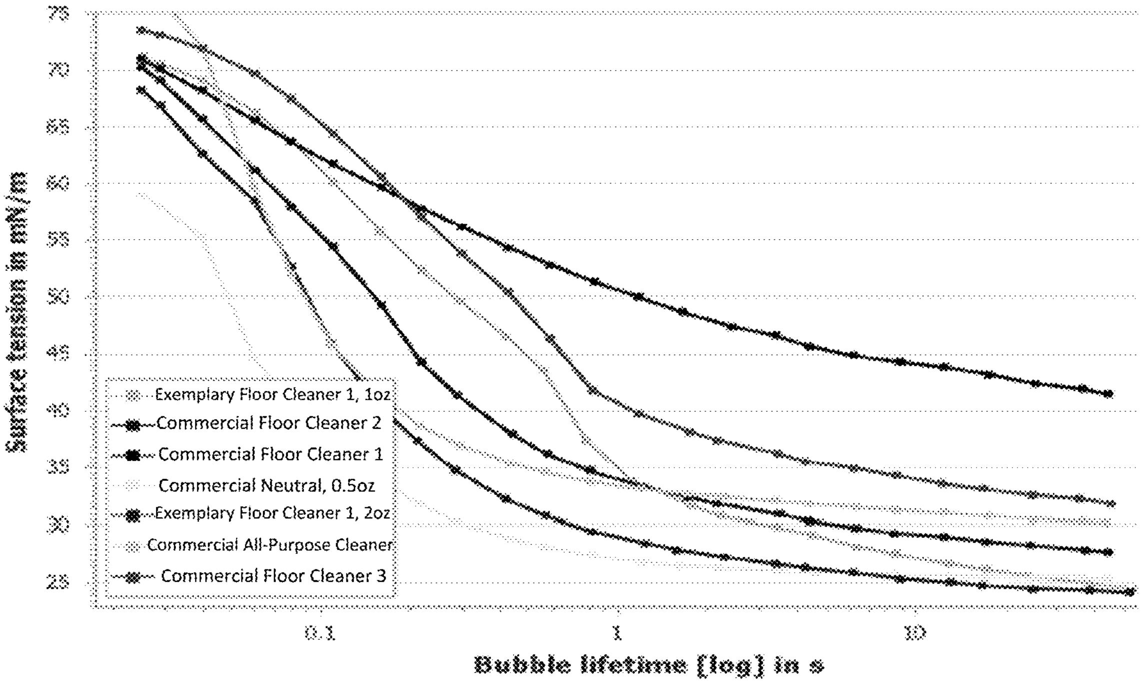
FIG. 6 shows a graphical representation of the comparison of exemplary floor cleaning compositions of the present application compared against various commercial cleaning compositions to evaluate the dynamic surface tension of the compositions.
Figure 7:
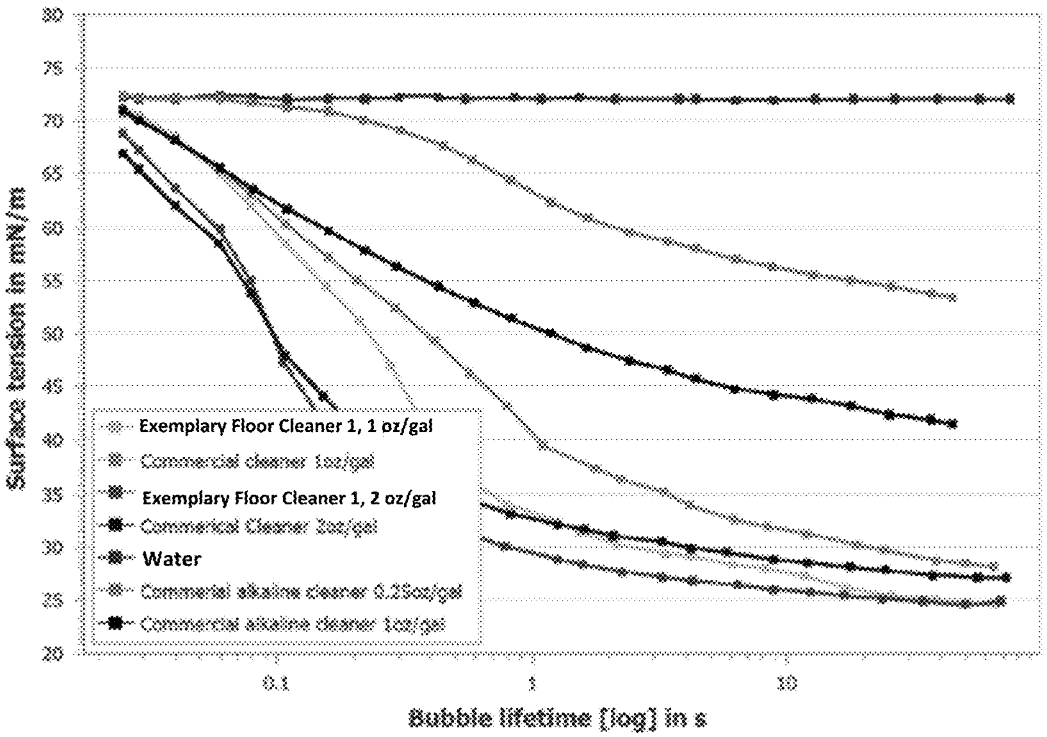
FIG. 7 shows a graphical representation of the comparison of exemplary floor cleaning compositions of the present application compared against various commercial cleaning compositions to evaluate the dynamic surface tension of the compositions.

Commercially available floor cleaners were compared against an exemplary hard surface cleaning composition of the present application to assess the dynamic surface tension. Graphical representations of the various cleaning compositions evaluated are shown in FIG. 6 and FIG. 7. Dynamic surface tension is a study of surfactant kinetics at the liquid-air interface. The exemplary formula was optimized for kinetics (rate of surface tension lowering) and ultra-low surface tension. An exemplary formulation has a dynamic surface tension preferably below 27 dynes, more preferably below 26 dynes, and most preferable below 25 dynes at use conditions. Therefore, measurements of surface tension versus the bubble lifetime in seconds was completed as shown in the FIG. 6-7.

The floor cleaner compositions tested included Exemplary Floor Cleaner 1 from Example 5, and Commercial Floor Cleaner 1 and Commercial Floor Cleaner 2 from Example 3. Further, Commercial Neutral (a nonionic surfactant based cleaner) and Commercial All-Purpose Cleaner (a floor and all-purpose cleaner containing anionic surfactant) from Example 5 were evaluated, in addition to Commercial Floor Cleaner 5 (an anionic surfactant-based floor cleaner).

As shown in FIGS. 6-7, the Exemplary Floor Cleaner 1 compositions (both 1 oz and 2 oz) exhibited favorable dynamic surface tension properties compared to other commercial floor cleaning products.

Example 6

Various floor cleaner compositions were evaluated for their tolerance to hard water. The compositions were formulated according to Table 4. All formulations included water with a water hardness of 17 gpg (grains per gallon). Observations on composition clarity was observed after a time period of 30 minutes. These observations are also included in Table 4.

TABLE 4

| | Composition 1 | Composition 2 | Composition 3 | Composition 4 |
|---|---|---|---|---|
| | 17 gpg water<br>250 ppm MEA<br>75 ppm NaOH<br>50 ppm Acusol 445 | 17 gpg water<br>250 ppm MEA<br>75 ppm NaOH<br>50 ppm Acusol 445<br>200 ppm AOS | 17 gpg water<br>250 ppm MEA<br>75 ppm NaOH<br>100 ppm Acusol 445<br>200 ppm AOS | 17 gpg water<br>250 ppm MEA<br>75 ppm NaOH<br>50 ppm Belclene 200<br>200 ppm AOS |
| Observations | Clear | Very hazy | Hazy | Clear |

The results show that the addition of anionic surfactant decreases hard water tolerance, as reflected by comparing the observations of Composition 1 versus Composition 2, from clear to very hazy. Increasing the amount of polyacrylic acid polymer can provide slight improvements in hard water tolerance as shown by the comparison of Composition 2 versus Composition 3, from very hazy to hazy. However, the inclusion of polymaleic polymers significantly improves the hard water tolerance of anionic surfactants under alkaline conditions, as shown by the comparison between Composition 3 versus Composition 4, from hazy to clear.

Figure 8:
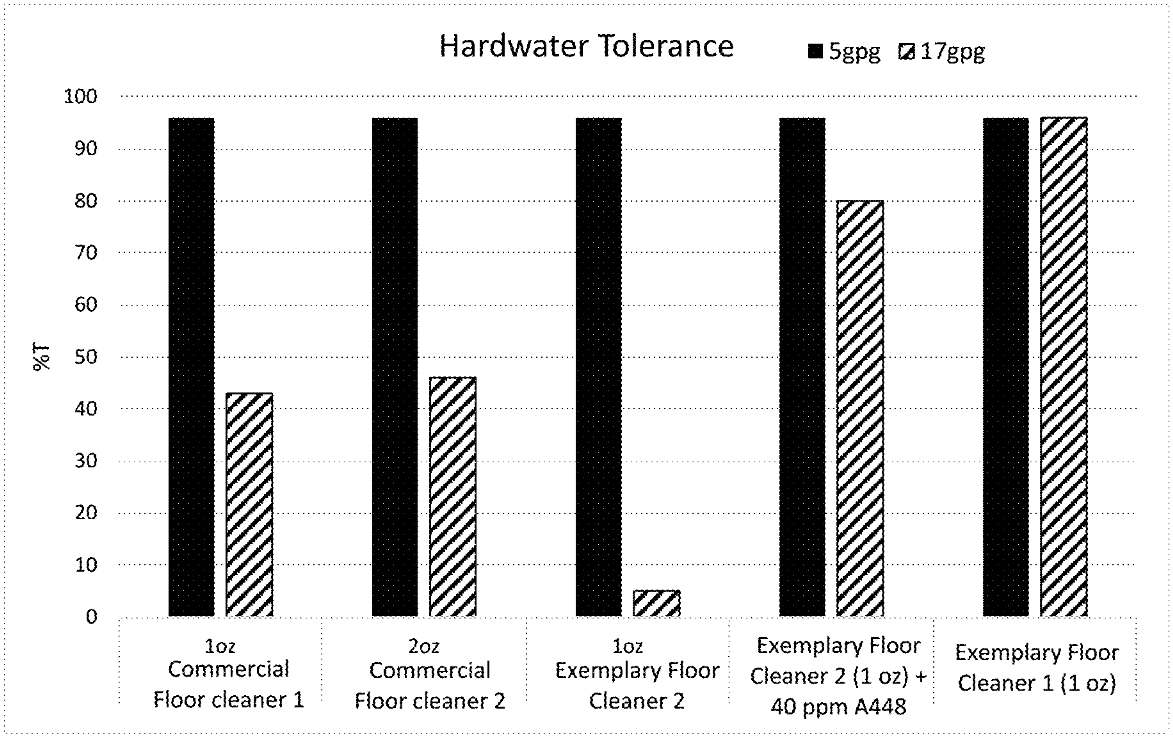
FIG. 8 shows the hardwater tolerance of various commercial and exemplary floor cleaner compositions at a water hardness of 5 gpg versus 17 gpg.

Further, the hard water tolerance of various floor cleaner compositions were evaluated, comparing a water hardness of 5 gpg versus 17 gpg. The floor cleaner compositions evaluated included Commercial Floor Cleaner 1 and Commercial Floor Cleaner 2 from Example 3. Further, Exemplary Floor Cleaner 2, Exemplary Floor Cleaner 2 with 40 ppm ACUSOL™ 448, and Exemplary Floor Cleaner 1 were evaluated. Exemplary Floor Cleaner 1 includes BELCLENE® 200, a water conditioning agent, whereas Exemplary Floor Cleaner 2 does not include a water conditioning agent. The results are shown in FIG. 8. The results measure the percent transmittance of the various formulations, where a lower percent transmittance demonstrates a lower water tolerance due to hazing of the use solution.

As shown in FIG. 8, all compositions tolerated the hard water well at 5 gpg. However, at 17 gpg, all compositions exhibited poor hard water tolerance. It was found that polymaleic (BELCLENE® 200) was surprisingly efficient at improving the hardwater tolerance of an alkaline anionic formulation. Hardwater did not negatively affect the solution clarity for the composition. These results further confirm that the addition of polymaleic polymers surprisingly improves the hard water tolerance of anionic surfactants.

Example 7

Floor cleaner compositions were further evaluated to compare foam height and stability. The compositions were agitated for 1 minute, and foam height was measured after 10 minutes. The compositions evaluated included Commercial Floor Cleaner 2 (from Example 3), Commercial Cleaner 3, and an Exemplary Floor Cleaner composition. Commercial Cleaner 3 represents a commercial pot and pan cleaner having good foam properties. The comparison of the various formulations demonstrated comparable foam height, indicating that the surfactant composition of the exemplary floor cleaner composition maintains foam stability.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A hard surface cleaning composition comprising:

from about 1 wt. % to less than 10 wt. % of an anionic surfactant, wherein the anionic surfactant is sulfated, sulfonated, and/or carboxylated;

from about 1 wt. % to about 6 wt. % of an amphoteric surfactant, wherein the amphoteric surfactant comprises an amine oxide, a betaine, a sultaine, or a mixture thereof;

from about 0.5 wt. % to about 2 wt. % of a nonionic surfactant, wherein the nonionic surfactant is a $C_8$-$C_{18}$ linear or branched, alkoxylated surfactant;

from about 0.01 wt. % to about 10 wt. % of a water conditioning agent comprising a polycarboxylic acid polymer;

an alkaline pH modifier comprising an alkali metal carbonate, an alkali metal hydroxide, an alkanolamine, a metal silicate, a metal borate, or a mixture thereof; and water;

wherein the composition has a pH of between about 8 and about 11.5;

wherein the hard surface cleaning composition has a viscosity of 100 cps or less;

wherein the hard cleaning composition has a surface tension of less than 26 dynes; and wherein the hard cleaning composition contains less than 0.01 wt. % of rheology modifiers.

2. The hard surface cleaning composition of claim 1, wherein the composition further comprises a dye, a fragrance, an oxidizer, a solvent, or a mixture thereof.

3. The hard surface cleaning composition of claim 1, wherein the anionic surfactant comprises a linear or branched $C_8$-$C_{22}$ alkyl benzene sulfonate, an alpha olefin sulfonate, a $C_8$-$C_{18}$ linear or branched alkyl sulfate, an alkyl ether sulfate, or a mixture thereof.

4. The hard surface cleaning composition of claim 1, wherein the amphoteric surfactant comprises linear or branched, alkoxylated or unalkoxylated $C_8$-$C_{18}$ amine oxide, amidobetaine, or a mixture thereof.

5. The hard surface cleaning composition of claim 1, wherein the alkaline pH modifier is present in an amount of between about 2 wt. % and about 12 wt. % and is two or more of an alkali metal carbonate, an alkali metal hydroxide, an alkanolamine, a metal silicate, and a metal borate.

6. The hard surface cleaning composition of claim 1, wherein the water conditioning agent is present in an amount of between about 0.1 wt. % and about 5 wt. %.

7. The hard surface cleaning composition of claim 3, wherein the anionic surfactant is in a concentration of from about 2 wt. % to about 10 wt. %.

8. The composition of claim 1, wherein the composition is free of acetate solvents.

9. The hard surface cleaning composition of claim 5, wherein the alkaline pH modifier comprises a mixture of an alkanolamine and an alkali metal hydroxide.

10. A method of cleaning a hard surface comprising:

diluting the composition of claim 1 to form a ready-to-use cleaning composition having between about 25 ppm and about 1000 ppm of the anionic surfactant, and between about 25 ppm and about 10000 ppm of the amphoteric surfactant, wherein the composition comprises the nonionic surfactant in a concentration between about 0.1 ppm and about 5000 ppm; and contacting the surface with the hard surface cleaning composition of claim 1.

11. The method of claim 10, further comprising rinsing the surface.

12. The method of claim 10, wherein the contacting is performed by spraying, wiping, pouring, and/or mopping the surface with the hard surface cleaning composition.

13. The method of claim 10, wherein the diluted hard cleaning composition comprises a water conditioning agent is present in an amount of between about 0.1 ppm and about 500 ppm; and wherein the alkaline pH modifier is in a concentration between about 25 ppm and 10,000 ppm.

14. The method of claim 11, wherein at least 50% of the soil is removed from the surface.

* * * * *